(12) United States Patent
Tabarovsky et al.

(10) Patent No.: US 6,308,136 B1
(45) Date of Patent: Oct. 23, 2001

(54) METHOD OF INTERPRETING INDUCTION LOGS IN HORIZONTAL WELLS

(75) Inventors: Leonty A. Tabarovsky; Michael Boris Rabinovich; David R. Beard, all of Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/519,029

(22) Filed: Mar. 3, 2000

(51) Int. Cl.$^7$ .................................................. G01V 3/38
(52) U.S. Cl. ...................................................... 702/7
(58) Field of Search .................... 324/338, 339; 702/6, 7, 10

(56) References Cited

U.S. PATENT DOCUMENTS

| | | | |
|---|---|---|---|
| 4,472,684 | * 9/1984 | Schuster | 324/339 |
| 5,666,057 | 9/1997 | Beard et al. | 324/339 |
| 5,703,773 | 12/1997 | Tabarovsky et al. | 364/422 |
| 5,854,991 | * 12/1998 | Gupta et al. | 702/7 |
| 5,884,227 | 3/1999 | Rabinovich et al. | 702/7 |

FOREIGN PATENT DOCUMENTS

WO 98/00733   1/1998  (WO) .

OTHER PUBLICATIONS

W. Hal Meyer; Interpretation of Propagation Resistivity Logs in High Angle Wells, SPWLA 39th Annual Logging Symposium, May 262–9, 1998, pp. 1–13.

Frank Hearn et al.; Advances in resistivity processing improve well interpretation, Oil & Gas Journal, Mar. 15, 1999, pp. 1–10.

A. A. Kaufman; Resolving capabilities of the inductive methods of electroprospecting, Geophysics, vol. 43, No. 7 (Dec. 1978); 1392–1398, 1 Fig., 2 Tables.

D. R. Beard et al.; A New, Fully Digital, Full–Spectrum Induction Device For Determining Accurate Resistivity with Enhanced Diagnostics and Data Integrity Verification, SPWLA 37th Annual Logging Symposium, Jun. 16–19, 1996, pp. 1–8, Figs. 17.

* cited by examiner

Primary Examiner—Donald E. McElheny, Jr.
(74) Attorney, Agent, or Firm—Madan, Mossman & Sriram, P.C.

(57) ABSTRACT

An induction logging tool is used in an inclined borehole for determining properties of subsurface formations formation away from the borehole. Measurements are made at a plurality of transmitter-receiver (T-R) distances. After correction of the data for skin effects and optionally correcting for eddy currents within the borehole, the shallow measurements (those from short T-R spacing or from high frequency data) are inverted to give a model of the near borehole (invaded zone resistivity and diameter) and the resistivity of the formation outside the invaded zone. Using this model, a prediction is made of the data measured by the mid-level and deep sensors (long T-R spacings). A discrepancy between these predicted values and the actual measurements made by the midlevel and deep sensors is indicative of additional layer boundaries in the proximity of the wellbore.

34 Claims, 4 Drawing Sheets

METHOD OF INTERPRETING INDUCTION LOGS IN HORIZONTAL WELLS

FIELD OF THE INVENTION

The invention is related to the field of induction logging of subsurface earth formations. Specifically, it relates to the use of induction logging for obtaining structural information of the subsurface away from a borehole.

BACKGROUND OF THE INVENTION

Induction resistivity well logging devices are known in the art for measuring the electrical resistivity of earth formations penetrated by wellbores. Electrical resistivity measurements are used for, among other things, to infer the fluid content of pore spaces of the earth formations.

Induction electrical resistivity instruments known in the art, such as one described in Hunka, J. "A New Resistivity Measurement System for Deep Formation Imaging and High Resolution Formation Evaluation", paper no. 20559, Society of Petroleum Engineers, Richardson, Tex., 1990, typically measure voltages induced in receiver coils positioned at spaced apart locations along the instrument. The voltages are induced by magnetic fields generated by eddy currents flowing in the earth formations around the instrument, in response to alternating currents of various frequencies being passed through a transmitter coil. The voltages induced in a particular one of the receiver coils are dependent on the electrical conductivity (which is inversely related to resistivity) of the media, including the earth formations, surrounding the instrument, and are dependent on the spacing of the particular receiver coil with respect to the transmitter coil. Generally, the greater the spacing between the transmitter coil and the particular receiver coil, the greater is the radial depth from the wellbore into the earth formation from which the measurement at that receiver coil corresponds. The vertical resolution of the measurements made by the closer-spaced receiver coils, however, is proportionately finer than is the vertical resolution of the measurements made by the more distant receiver coils.

When the wellbore is drilled, fluids from the drilling process may be forced into the pore spaces of some of the earth formations, changing their fluid content and therefore their resistivity. The process of fluid being forced into the pore spaces is generally referred to as "invasion". Wellbore can be drilled with fluids having differing electrical resistivities, and the wellbore itself can have widely varying diameters over its length. The effects of variable wellbore diameter and differing wellbore fluid resistivity can indeterminately affect the total voltage being induced in each one of the receiver coils, because eddy currents also can flow within the conductive wellbore fluid and within that portion of the earth formations surrounding the wellbore subject to the invasion (the so-called "invaded zone").

U.S. Pat. No. 5,703,773 (referred hereafter as the "'773 patent") having the same assignee as the present application and the contents of which are fully incorporated herein by reference, discloses a method of inversion processing signals from an induction well logging instrument. The instrument includes a transmitter and a plurality of receivers at axially spaced apart locations. The method includes skin effect correcting the responses of the receivers by extrapolating the receiver responses to zero frequency. A model is generated of the media surrounding said instrument. Conductivities of elements in the model are adjusted so that a measure of misfit between the skin-effect corrected receiver responses and simulated receiver responses based on the model is minimized. The geometry of the model is adjusted so that the measure of misfit between the skin-effect corrected receiver responses and the simulated receiver responses based on the model is further minimized.

The method of the '773 patent and other prior art processing methods for well logs are developed for vertical or near vertical wells. If the well deviation exceeds 30°–45°, traditional methods may fail. To interpret the data, 3-D modeling and inversion must be carried out. However, 3-D modeling and inversion is rarely practical due to the computational time requirements and the unavailability of powerful computers. As would be known to those versed in the art, some information about the subsurface is obtained using measurement-while-drilling ("MWD") methods in horizontal or near horizontal boreholes. In an MWD environment, there is relatively little invasion of the formation by the drilling mud and the relatively short transmitter to receiver spacings may be able to provide sufficient information about the formation resistivity to be useful in applications such as geosteering.

It is desirable to have an invention that is able to give information further away from the borehole in a near horizontal well. FIG. 1 is an end-on view of a borehole 10 within a reservoir rock 20. Surrounding the well is an invaded zone 12. Also shown in FIG. 1 are interfaces 22 and 26 marking a resistivity contrast between the zone 20 and zones 24 and 28. Typically, the interfaces 22 and 26 could be bed boundaries marking the separation between a reservoir formation 20 and non-reservoir formations 24 and 28. However, the boundary 26 could also be a fluid contact within a formation marking the separation between a water wet region 28 and a hydrocarbon wet region 20 while formation 22 is the caprock. Another possible configuration is that 20 is a water wet reservoir rock while 24 is the hydrocarbon saturated region with 28 being the seal beneath the reservoir.

As part of the reservoir evaluation process, it would be desirable to map the boundaries such as 22 and 26 accurately. Such information is useful in the estimation of reserves and in development of completion procedures for developing the reservoir. The present invention satisfies this need for situations such as in FIG. 1 and also in other situations where information relating to formation properties away from the borehole is needed.

SUMMARY OF THE INVENTION

The present invention is a method for making induction log measurements in an inclined borehole and determining properties of subsurface formations formation away from the borehole. Measurements are made using an induction logging instrument having a plurality of transmitter-receiver (T-R) distances. After correction of the data for skin effects and optionally correcting for eddy currents within the borehole, the shallow measurements (those from short T-R spacing or from high frequency data) are inverted to give a model of the near borehole (invaded zone resistivity and diameter) and the resistivity of the formation outside the invaded zone. Using this model, a prediction is made of the data measured by the mid-level and deep sensors (long T-R spacings). A discrepancy between these predicted values and the actual measurements made by the midlevel and deep sensors is indicative of additional layer boundaries in the proximity of the wellbore. The midlevel and deep sensor data are corrected for invasion effects and inverted using the model derived from the shallow data to give an estimate of the distance to these additional layer boundaries and of the resistivity beyond these additional boundaries. In this manner, resistivity measurements in a near horizontal borehole may be used to map subsurface layers away from the borehole. In one embodiment of the invention, the quadrature component of the signal induced in the receiver coils is used. This quadrature component is independent of T_R spacing and has a larger depth of penetration than the commonly used in-phase component of the receiver signal.

DESCRIPTION OF THE PREFERRED EMBODIMENT

The present invention is a method for determination of boundaries and material properties of regions having different electrical resisitivities away from a near horizontal borehole. The invention is best understood by reference to FIGS. 1–4 and the related discussion hereunder.

Figure 2:
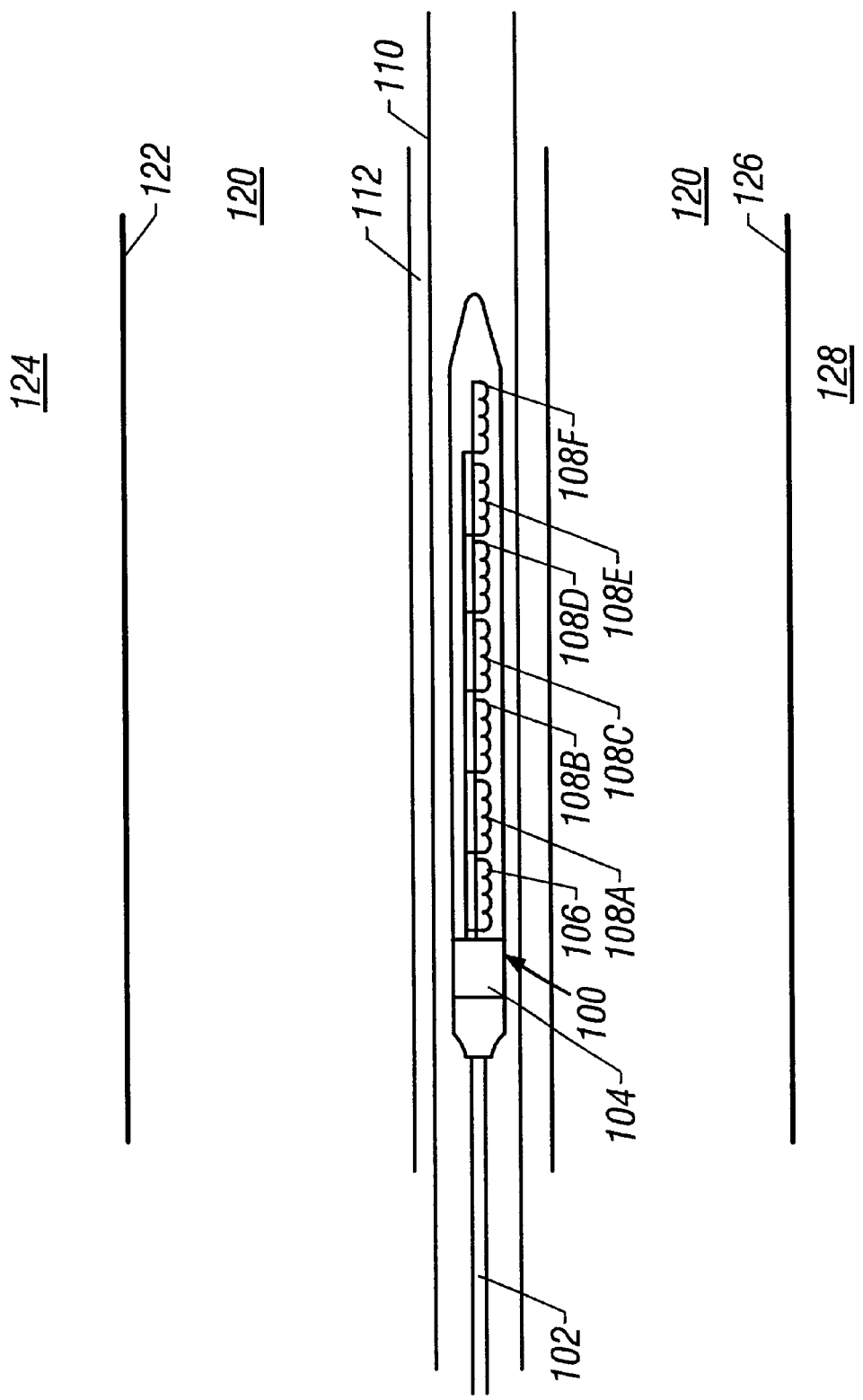
FIG. 2 is a schematic illustration of a logging tool within a near horizontal borehole showing the transmitter and receiver configuration.

FIG. 2 shows an induction well logging instrument 100 disposed in a generally horizontal wellbore 110 penetrating earth formations. The instrument 100 is typically lowered into the wellbore 100 at one end of an armored electrical cable 102 by suitable apparatus at the surface of the earth (not shown). An instrument which will generate appropriate induction signals for performing the process of the present invention is described, for example, in U.S. Pat. No. 5,452,761 issued to Beard et al. and having the same assignee as the present application. The instrument described in the Beard et al '761 patent is not an exclusive representation of well logging instruments which can generate signals for performing the process of the present invention and therefore is not meant as a limitation on the present invention.

Figure 1:
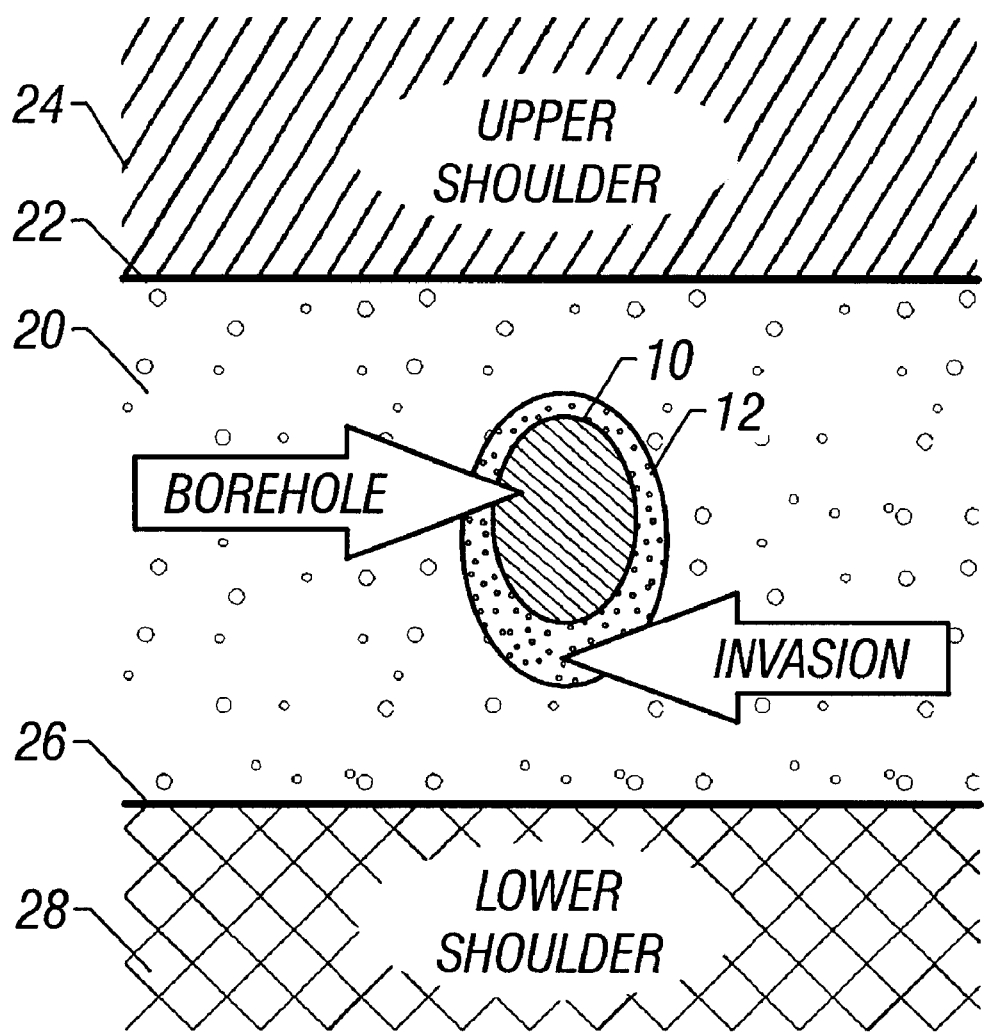
FIG. 1 s a transverse cross section of a logging tool within a near horizontal borehole showing subsurface formations in proximity to the borehole.

The instrument 100 can include a telemetry/signal processing unit 104 (SPU). The SPU 104 can include a source of alternating current (not shown separately) to be conducted through a transmitter coil 106 disposed on the instrument 100 Receiver coils 108A–108F can be disposed at axially spaced apart locations along the instrument 100 The SPU 104 include receiver circuits (not shown separately) connected to the receiver coils 108A–108F for detecting voltages induced in each of the receiver coils 108A–108F The SPU 104 can also impart signals to the cable 102 corresponding to the magnitude of the voltages induced in each of the receiver coils 108A–108F. It is to be understood that the number of receiver coils and the arrangement of the coils shown in the instrument in FIG. 1 is not meant to be a limitation on the present invention. It is to be further understood that the receiver coils shown in FIG. 1 can either be single coils or a type of coil known in the art as "mutually balanced" wherein a second coil(not shown) is series connected in inverse polarity to the primary coil (not shown) so as to reduce the effect of direct induction from the transmitter coil 106.

As is understood by those skilled in the art, the alternating current passing through the transmitter coil 106 induces eddy currents in the earth formations 120, 124 and 128. The eddy currents correspond in magnitude to the electrical conductivity of the earth formations 120, 124 and 128 and to the relative position of the particular earth formation with respect to the transmitter coil 106. The eddy currents in turn induce voltages in the receiver coils 108A–108F, the magnitude of which depends on both the eddy current magnitude and the relative position of the earth formation with respect to the individual receiver coil 108A–108F.

A more closely spaced receiver coil such as 108A would have more of its voltage induced by eddy currents flowing from entirely within a closer formation such as 120 than would be the case for a longer spaced receiver coil such as 108F. Conversely, the eddy currents which induce the voltages in receiver coil 108A would more likely correspond to the conductivity within a zone such as shown at 112, which is affected by fluid "invasion" into its pore spaces from the liquid phase of a fluid used to drill the wellbore (commonly known as "drilling mud", the liquid phase known as "mud filtrate").

The drilling mud itself can be electrically conductive. Eddy currents can flow in such conductive drilling mud, and therefore the voltages induced in each of the receiver coils 108A–108F can also partially depend on the conductivity of the mud and the diameter of the wellbore. As is understood by those skilled in the art, the wellbore diameter is subject to variation as a result of "caving" or "washout".

The signals corresponding to the voltages in each receiver coil 108A–108F can be transmitted along the cable 102 to surface electronics (not shown). The surface electronics can include processors (not shown) for analyzing the signals from the instrument 100according to the present invention.

As is understood by those skilled in the art, the correspondence between the magnitude of the voltages induced in each receiver coil 108A–108F and the conductivity of the media surrounding the instrument 100 is affected by a phenomenon referred to as the "skin effect". In the present embodiment of the invention, the voltage signals induced in each receiver coil 108A–108F can be adjusted to compensate for the skin effect to more precisely correspond to the conductivity of the media surrounding the instrument 100. The present invention uses the method described in the '773 patent to compensate for the skin effect and produce a calculated response for the zero frequency limit of the apparent conductivity at each of the receiver coils 108A–108F.

After the skin effect correction is performed, it is desirable to further adjust the signals from each one of the receiver coils 108A–108F for the effect of the eddy current signal which originates in the wellbore 110. Methods for correcting the receiver coils signals are known in the art, one of which is described, for example in G. P. Grove and G. N. Minerbo, "An Adaptive Borehole Correction Scheme for Array Induction Tools", SPWLA 32nd Annual Logging Symposium, pp 1–25, 1991). It is to be understood that the step of correcting the receiver coil signals for the effects of the conductivity of the wellbore 110 is optional in performing the process of the present invention. Correction for wellbore 110 conductivity can improve the accuracy of the final result. Under some conditions, however, particularly when the drilling mud comprises a substantially non-conductive liquid phase, the diameter of the wellbore D is relatively small (typically in a range of 5 to 8 inches where the diameter of the instrument 100 is about 3⅝ inches), and the instrument 100 is substantially centralized in the wellbore 110, the overall effect of the wellbore 110 on the receiver coil signals can be negligible, and the step of correction can be omitted without seriously affecting the accuracy of the result of the inversion process.

The '773 invention describes a method in which data from an instrument such as the one described above are used to determine a conductivity model for the formation surrounding a vertical borehole. As would be known to those versed in the art, in a vertical borehole that intersects a number of substantially horizontal layers, the conductivity model of the earth formations is a lot more complicated than in the present situation. For a vertical borehole, each layer has a different conductivity associated with it and the response of each receiver coil depends upon the relative position of the receiver coil to the individual layer boundaries.

Figure 3:
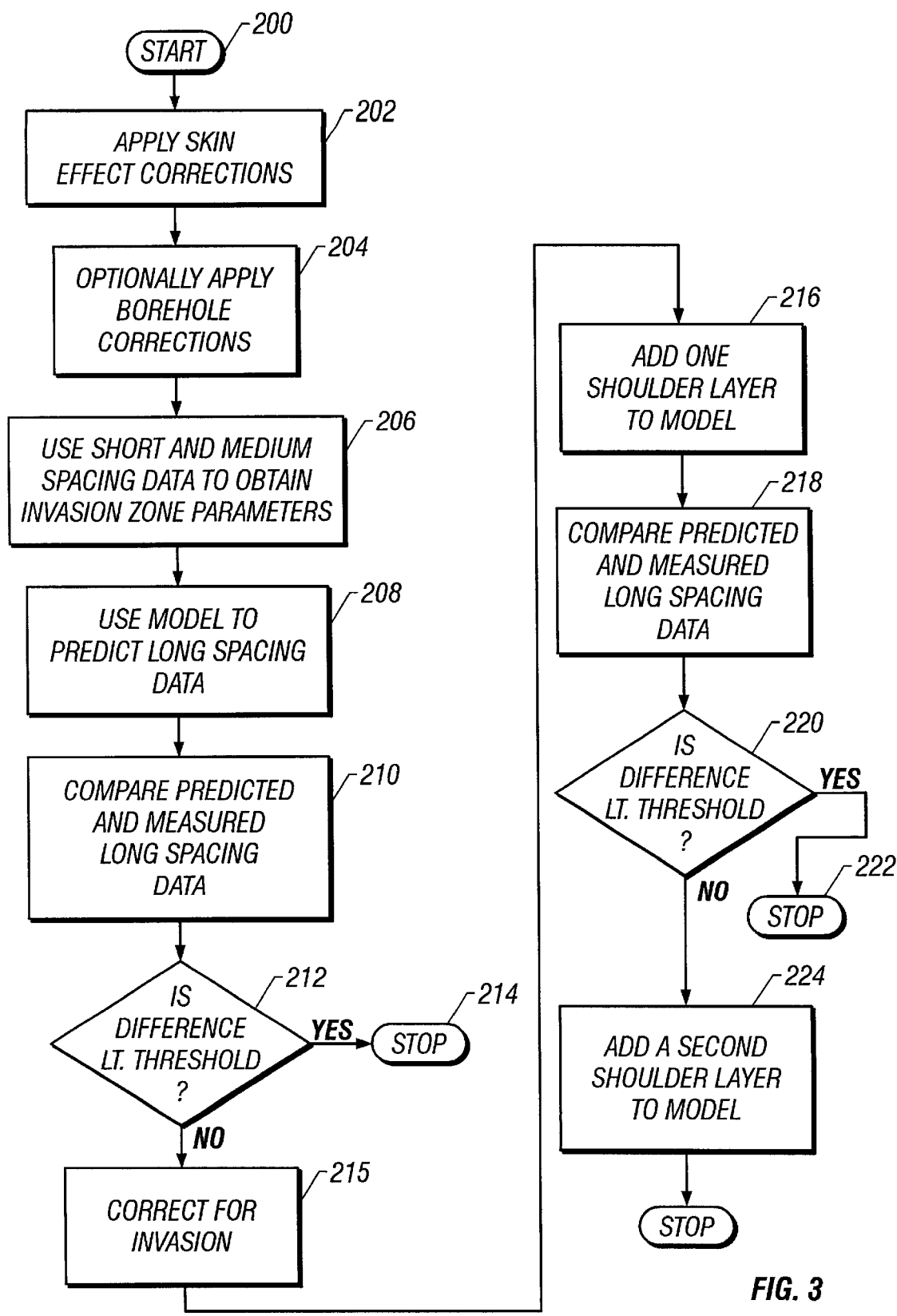
FIG. 3 is a flow chart of the major steps of the method of the present invention for obtaining information about subsurface formations in the vicinity of a borehole.

The use of the method of the '773 invention here is best understood with reference to FIG. 3. The process starts at 200 with the data from all the receivers 108A–108F. The skin effect correction is applied 202 and optionally, a correction for fluid in the borehole is applied 204. With the configuration of the tool in a near horizontal borehole as shown in FIGS. 1 and 2, those versed in the art would recognize that the near receivers, e.g., 108A–108B are responsive almost entirely to the invaded zone 12, 112, while the intermediate receivers 108D–108D are also affected by the material immediately outside the invaded zone 20, 120, referred to hereafter as the uninvaded zone. Finally, the far sensors 108E–108F are also affected by data from the shoulder zones described below. Using the method of the '773 patent, these data from the near and intermediate receivers are inverted to give parameters of the invaded zone and the uninvaded zone. These include the conductivity of the invaded zone and the uninvaded zone and the thickness of the invaded zone. Those versed in the art would recognize that what is important is the depth of penetration into the formation of the induced electromagnetic signal. In the embodiment of the '773 patent, the near receivers are "shallow" sensors, the intermediate receivers are "midlevel" sensors and the far receivers are the "deep" sensors. Other embodiments exist in which shallow data is obtained by high frequency signals while the deep data is obtained by low frequency electromagnetic induction signals. Such variations are intended to be within the scope of the present application. Accordingly, the near receivers such as 108A–108B will hereafter be referred to as the shallow sensors, 108C–108D as sensors and the far receivers such as 108E–108F will be referred to as the deep sensors.

Using the conductivity derived for the near zone, a predicted values for corrected measurements in the midlevel and deep sensors are obtained 208 assuming that there are no boundaries such as 122 and 126, i.e., that the formation is radially substantially homogenous with respect to the borehole axis. These predicted values at the midlevel and deep sensors are compared to the actual measurements 210. At 212, a comparison between the predicted and actual corrected measurements is made. If this difference is less than a set threshold value, then the process stops 214: the midlevel and deep data are consistent with the model derived from the shallow data and there are no boundaries such as 122 and 126 present. If the difference between the predicted and actual corrected measurements exceeds the threshold 212 then the midlevel and deep data are not consistent with the shallow data. At this point, the data are corrected for invasion 215 and the inversion method of the '773 patent is used to derive an enhanced model 216 including therein a distance to a boundary such as 122, 126 and a conductivity on the far side 124, 128 (i.e., away from the borehole) of the boundary.

Those versed in the art would recognize that with azimuthally symmetrical tools such as used in the '773 patent, the inversion would not provide any information regarding the direction of the additional boundary. The additional boundary in the enhanced model is called a shoulder boundary and the layer on the side of the shoulder boundary away from the borehole is called a shoulder layer.

Using the enhanced model, corrected data for the midlevel and deep sensors is predicted and compared with the actual corrected midlevel and deep sensor data 218. If this difference 220 is less than a set threshold value, then the process stops 214: the deep data are consistent with the enhanced model having a single shoulder layer. If the difference between the predicted and actual corrected data exceeds the threshold then the deep data are not consistent with the shallow data and a model having a single shoulder layer. At this point, the method of the '773 patent is used to derive an refined model 224 including therein a distance to a second shoulder and a conductivity for the second shoulder layer.

In a preferred embodiment of the invention, the two shoulder layers are on opposite sides of the borehole and are parallel to each other, i.e., the inversion and modeling is one dimensional. As noted above, the enhanced model and the refined model by themselves cannot define the direction in which the one or two shoulders lie. However, based upon the relative values of the resistivity of the uninvaded zone and the one or two shoulder layers, an inference can be drawn as to the nature and position of the shoulder layers.

As an example only, and without limitation, if the uninvaded zone has a low conductivity, consistent with a hydrocarbon rich reservoir rock and the first shoulder layer has a very high conductivity, it suggests that the first shoulder layer is a water layer. This water layer would be positioned below the borehole. The second shoulder layer would then be a caprock above the borehole. Conversely, if the uninvaded zone has a high conductivity, indicative of a water saturated reservoir, then a shoulder zone with low conductivity could be indicative of a hydrocarbon/water boundary positioned above the borehole. Those versed in the art would recognize various combinations of the resistivities of the invaded zone, the first and second shoulder zones, as being diagnostic of various combinations of water saturated rock, gas saturated rock, oil saturated rock and impermeable caprock.

Figure 4:
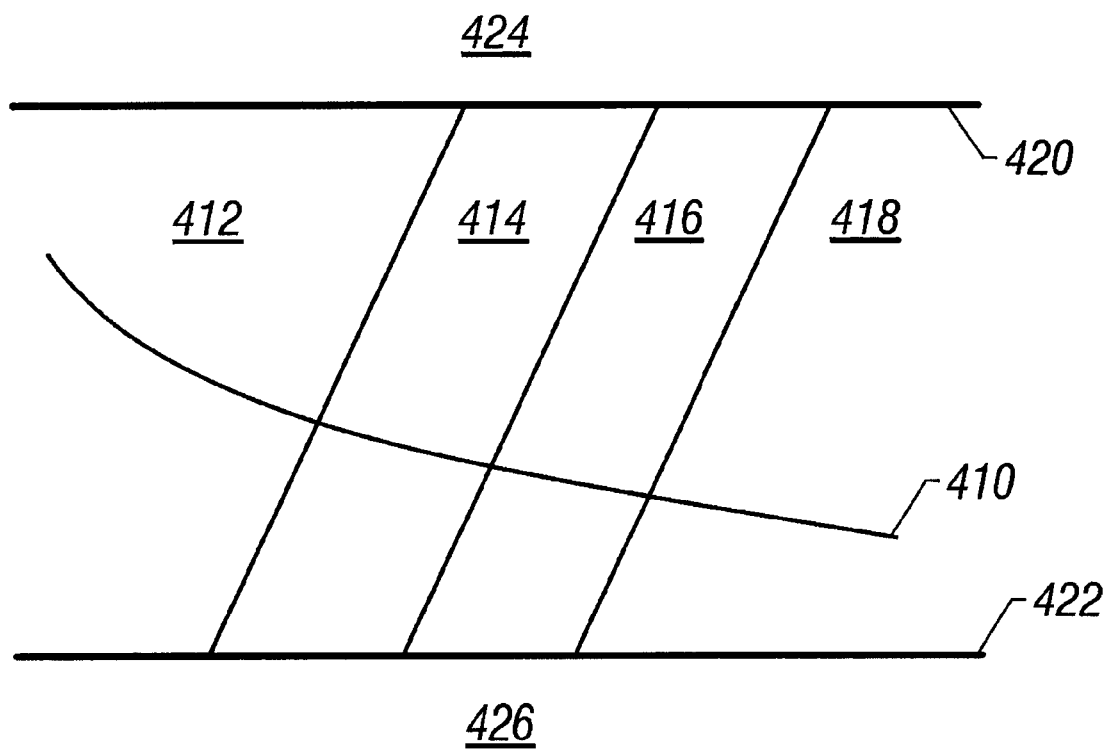
FIG. 4 is an illustration of the geometry of an inclined borehole within the subsurface with uncomformable beds.

FIG. 4 illustrates a situation in which a near horizontal wellbore 410 intersects a plurality of steeply dipping formations 412, 414, 416, 418. Inversion of induction log data acquired in such a wellbore makes it possible to determine the subsurface structure in terms of layer thicknesses. Data from the shallow sensors are inverted in a 2-D inversion to give properties of the formation in the immediate vicinity of the borehole and, in particular, layer thicknesses $l_1, l_2 \ldots$ of the layers as traversed by the borehole. These layer resistivities are then used as an initial estimate for a 1-D inversion of the data from the deep sensors to give the shoulder boundaries 420, 422 and the shoulder beds 424, 426. The methodology discussed above may be used to obtain a resistivity model of the subsurface.

Another aspect of the invention uses multifrequency and/or quadrature data as input to the inversion process. U.S. Pat. 5,884,227 having the same inventors and assignee as the present application and the contents of which are fully incorporated herein by reference, shows that when data are acquired at m angular frequencies $\omega_1, \omega_2, \omega_3, \ldots \omega_m$, the in-phase components of voltages in the receiver coils 108A–108F in FIG. 2 generally correspond to the imaginary component of the magnetic field. This imaginary component of the magnetic field may be represented by a Taylor series of the form $$\Im(H_z) = \sum_{k=1}^{k=\infty} \Theta_{k/2} \omega^{k/2} \quad (1)$$

A general representation of the apparent conductivity from the imaginary component of the magnetic field is given by a Taylor series expansion of the form $$\sigma_a = \sum_{k=0}^{k=\infty} s_{k/2} \omega^{k/2}; s_{2j-1} = 0; j = 1, 2, \ldots, \infty \quad (2)$$

where $s_{k/2}$ are coefficients depending on the conductivity distribution and the tool's geometric configuration. They do not depend upon the frequency.

Considering the series for each of the measured frequencies, this gives $$\begin{bmatrix} \sigma_a(\omega_1) \\ \sigma_a(\omega_2) \\ \vdots \\ \sigma_a(\omega_{m-1}) \\ \sigma_a(\omega_m) \end{bmatrix} = \begin{bmatrix} 1 & \omega_1^{1/2} & \omega_1^{3/2} & \ldots & \omega_1^{n/2} \\ 1 & \omega_2^{1/2} & \omega_2^{3/2} & \ldots & \omega_2^{n/2} \\ \vdots & \vdots & \vdots & \ldots & \vdots \\ 1 & \omega_{m-1}^{1/2} & \omega_{m-1}^{3/2} & \ldots & \omega_{m-1}^{n/2} \\ 1 & \omega_m^{1/2} & \omega_m^{3/2} & \ldots & \omega_m^{n/2} \end{bmatrix} \begin{bmatrix} s_0 \\ s_{1/2} \\ s_{3/2} \\ \vdots \\ s_{n/2} \end{bmatrix} \quad (3)$$

where m represents the number of component frequencies, and n can be selected from a Taylor series expansion for an apparent conductivity integral.

The ultimate objective of the expansion series in Eq. (3) is to solve for the coefficient at the zero-frequency limit- s& Solving a system according to Eq. (3) will calculate a receiver coil response approximately equal to that described in H. G. Doll, "Introduction to Induction Logging and Application to Logging Wells Drilled with Oil Base Mud", AIME Transactions Vol. 1, No. 6, pp 148–162 (1949), for the zero frequency limit of the apparent conductivity at each one of the receiver coils (108A–108F in FIG. 1).

The leading terms of the expansion given by Eq. (1) are of the form $$h(f_1) = f_1 h_1 + f_1^{3/2} h_2 + f_1^2 h_3 + \ldots \quad (4)$$

where $f_1$ is the frequency. The components $f_1 h_1$ is substantially dependent on the conductivity in the wellbore region, i.e., this term depends mainly on the conductivity of the wellbore fluid. PCT Patent Publication WO 98/0073 shows that by making the magnetic field measurement at a second frequency $f_2$, a second field measurement $h_2$ is obtained $$h(f_2) = f_2 h_1 + f_2^{3/2} h_2 + f_2^2 h_3 + \ldots \quad (5)$$

A linear combination of the measurements at the two frequencies $$h(f_1, f_2) = h(f_1) - (f_1/f_2) h(f_2) \quad (6)$$

makes it possible to eliminate terms that are linear and frequency. As would be known to those versed in the art, the term that is linear in frequency is primarily responsive to the borehole. Having done this, it is possible to invert the multiple frequency data to obtain the bed boundaries for the configurations of FIGS. 1, 4 or 5.

Specifically, for the configuration of FIG. 1, a two-dimensional (2-D) inversion of the shallow data is carried out to give the formation resistivity for the region 20 of FIG. 1 as at 206 in FIG. 3. The rest of the analysis proceeds as discussed above with reference to FIG. 3.

For the subsurface configuration of FIG. 4, single-frequency shallow data may be used to derive the borehole and formation resistivities as discussed above with respect to FIG. 1. Alternatively, multiple frequency data may be used for a one-dimensional inversion of the deep data to obtain the positions of the boundaries 420, 422 and the resistivities of the layers 424, 426. In a preferred embodiment of the invention, the multiple frequency data are acquired at two frequencies.

One embodiment of the present invention includes measurements of the quadrature component of the induced signals in the receiver coils (the quadrature component is 90° out of phase with the phase of the transmitter signal). The quadrature component of eq. (2) gives the following equation:

$$\omega \begin{bmatrix} \sigma_a(\omega_1) \\ \sigma_a(\omega_2) \\ \vdots \\ \sigma_a(\omega_{m-1}) \\ \sigma_a(\omega_m) \end{bmatrix} = \begin{bmatrix} 1 & \omega_1^{3/2} & \omega_1^2 & \ldots & \omega_1^{n/2} \\ 1 & \omega_2^{3/2} & \omega_2^2 & \ldots & \omega_2^{n/2} \\ \vdots & \vdots & \vdots & \ldots & \vdots \\ 1 & \omega_{m-1}^{3/2} & \omega_{m-1}^2 & \ldots & \omega_{m-1}^{n/2} \\ 1 & \omega_m^{3/2} & \omega_m^2 & \ldots & \omega_m^{n/2} \end{bmatrix} \begin{bmatrix} s_{-1} \\ s_{3/2} \\ s_2 \\ \vdots \\ s_{n/2} \end{bmatrix} \quad (7)$$

In eq. (7), the $\sigma_a$'s are the apparent conductivities measured at the corresponding frequencies. Solving the system of eq. (7) with respect to $s_{3/3}$ gives the zero-frequency limit for quadrature measurements. It is known in literature that this component is independent of the tool spacing and it also has a large depth of investigation. These two properties are important for induction logging in near horizontal boreholes and inversion of the data makes it possible to identify bed boundaries a distance from the borehole.

Those versed in the art would recognize that if the number of frequencies m at which quadrature measurements are made is greater than n, the number of terms in the series expansion given by eq. (2), then eq. (7) is an overdetermined system of equations. Inversion of the values of $s_{3/2}$ makes it possible to obtain the subsurface model corresponding to any of FIGS. 1, 4 and 5. In a preferred embodiment of the invention, the in-phase components of the shallow data are used to obtain the resistivity of the formation near the borehole and the quadrature component data at a low frequency limit are used to obtain the distances and resistivities of the shoulder beds.

Those skilled in the art will devise other embodiments of this invention which do not depart from the spirit of the invention as disclosed herein. Accordingly, the invention should be limited in scope only by the attached claims.

What is claimed is:

1. A method of logging earth formations penetrated by a borehole using a well logging instrument conveyed therein, the method comprising:

(a) activating a transmitter on the instrument to transmit an electromagnetic (EM) wave thereby inducing currents in the earth formations;

(b) measuring signals induced in a plurality of receivers on the instrument in response to the currents induced in said earth formations;

(c) processing with a processor a first subset of the measured signals for determining properties of the formation in an invaded zone proximate to the borehole and in an uninvaded zone immediately outside said invaded zone; and (d) using said determined properties and at least one additional subset of the measured signals to determine a distance to at least one boundary outside the invaded zone and a resistivity of the earth formations on a side of the at least one boundary away from the borehole.

2. The method of claim 1, wherein said properties of the invaded zone comprise a resistivity and radius of the invaded zone.

3. The method of claim 2 wherein said properties of said uninvaded zone comprise a resistivity thereof.

4. The method of claim 1 wherein said measured signals comprise shallow, midlevel and deep signals and said first subset comprises shallow and midlevel signals.

5. The method of claim 1 wherein determining properties of the invaded zone and of the uninvaded zone immediately outside the invaded zone further comprises performing an inversion of said first subset of signals.

6. The method of claim 4 wherein the at least one additional subset comprises deep signals.

7. The method of claim 4 wherein said shallow signals comprise signals corresponding to short transmitter-receiver spacings, said deep signals comprise corresponding to long transmitter-receiver spacings, and said midlevel signals comprise signals corresponding to intermediate transmitter-receiver spacings.

8. The method of claim 4 wherein said shallow signals comprise signals having a high frequency, said deep signals comprise signals having a low frequency, and said midlevel signals comprise signals having an intermediate frequency.

9. The method of claim 1 wherein the at least one boundary comprises two boundaries.

10. The method of claim 9 wherein the two boundaries are on opposite sides of the borehole.

11. The method of claim 10 further comprising using values of resistivities of the uninvaded zone and of the earth formations on sides of the boundaries away from the borehole for estimating petrophysical and fluid properties of said portions of earth formations.

12. The method of claim 1 wherein determining properties of the formation in the invaded zone further comprises determining and applying a skin effect correction.

13. The method of claim 1 wherein the first subset of the measured signals have a phase substantially the same as a phase of said transmitted EM wave.

14. The method of claim 1 wherein the second subset of the measured signals have a phase that is one of (i) substantially the same as the phase of said transmitted EM wave, and, (ii) substantially orthogonal to the phase of said transmitted EM wave.

15. The method of claim 1 further comprising transmitting said electromagnetic wave at a plurality of frequencies.

16. The method of claim 15 further comprising transmitting said electromagnetic wave at a plurality of frequencies and wherein performing said inversion further comprises using a Taylor series expansion.

17. The method of claim 3 further comprising determining from the determined resistivities immediately outside the invaded zone and on the side of the at least one boundary away from the borehole, at least one of (i) a fluid difference across the at least one boundary, and, (ii) a lithology difference across the at least one boundary.

18. A method of determining a distance to at least one bed boundary in earth formations penetrated by a near horizontal borehole using an induction logging instrument conveyed therein, the method comprising:

(a) using a plurality of transmitter-receiver combinations on the logging instrument having different transmitter-receiver distances to obtain signals indicative of properties of the earth formations;

(b) determining from a first subset of said signals properties of the formation in an invaded zone proximate to the borehole and an uninvaded zone immediately outside said invaded zone, said at least one bed boundary being outside the invaded zone; and (c) using said determined properties and at least one additional subset of said signals for determining a distance to the at least one boundary.

19. The method of claim 18 wherein said properties of the invaded zone comprise a resistivity and radius of the invaded zone.

20. The method of claim 18 wherein said properties of said uninvaded zone comprise a resistivity thereof.

21. The method of claim 18 wherein said first subset of said signals have smaller transmitter-receiver distances than said second subset of said signals.

22. The method of claim 18 wherein determining properties of the invaded zone and of the uninvaded zone immediately outside the invaded zone further comprises performing an inversion of said first subset of signals.

23. The method of claim 18 wherein the at least one boundary comprises two boundaries disposed on opposite sides of the borehole.

24. The method of claim 18 wherein determining properties of the formation in the invaded zone further comprises determining and applying a skin effect correction.

25. The method of claim 18 wherein the second subset of the measured signals have a phase that is one of (i) substantially the same as the phase of an electromagnetic wave transmitted by a transmitter, and, (ii) substantially orthogonal to a phase of an electromagnetic wave transmitted by a transmitter.

26. A method of determining a distance to at least one bed boundary in earth formations penetrated by a near horizontal borehole using an induction logging instrument conveyed therein, the method comprising:

(a) using at least one transmitter and at least one receiver on the logging instrument at a plurality of frequencies to obtain signals indicative of properties of the earth formations;

(b) determining from a first subset of said signals properties of the formation in an invaded zone proximate to the borehole and an uninvaded zone immediately outside said invaded zone, said at least one bed boundary being outside the invaded zone; and (c) using said determined properties and at least one additional subset of said signals for determining a distance to the at least one boundary.

27. The method of claim 26 wherein said properties of the invaded zone comprise a resistivity and radius of the invaded zone.

28. The method of claim 26 wherein said properties of said uninvaded zone comprise a resistivity thereof.

29. The method of claim 26 wherein said first subset of said signals have higher frequencies than said second subset of said signals.

30. The method of claim 26 wherein determining properties of the invaded zone and of the uninvaded zone immediately outside the invaded zone further comprises performing an inversion of said first subset of signals.

31. The method of claim 26 wherein the at least one boundary comprises two boundaries disposed on opposite sides of the borehole.

32. The method of claim 26 wherein determining properties of the formation in the invaded zone further comprises determining and applying a skin effect correction.

33. The method of claim 26 wherein the second subset of the measured signals have a phase that is one of (i) substantially the same as the phase of an electromagnetic wave transmitted by a transmitter, and, (ii) substantially orthogonal to a phase of an electromagnetic wave transmitted by a transmitter.

34. The method of claim 26 further comprising representing said signals in a Taylor series expansion.

* * * * *